Figure 1:
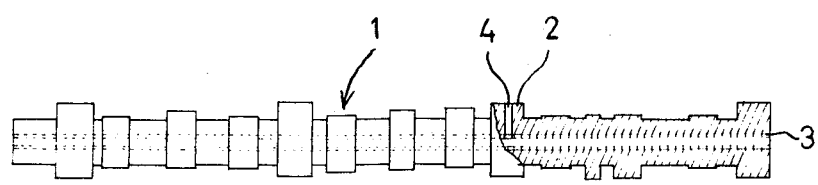

United States Patent
Takahashi et al.

[15] 3,689,986
[45] Sept. 12, 1972

[54] METHOD OF CASTING COMPOSITE CAM SHAFTS

[72] Inventors: Kentaro Takahashi, Ohmiya; Yoshihito Sato, Kawaguchi, both of Japan

[73] Assignee: Nippon Piston Ring Co., Ltd., Tokyo, Japan

[22] Filed: Aug. 26, 1970

[21] Appl. No.: 67,285

[30] Foreign Application Priority Data

April 1, 1967   Japan ................42/20820

[52] U.S. Cl. .................29/527.6, 164/75, 164/76
[51] Int. Cl. ...........................................B22d 31/00
[58] Field of Search....164/11, 28, 98, 100, 101, 112, 164/231, 366–369, 411, 76; 74/567 US; 29/527.6

[56]           References Cited

UNITED STATES PATENTS

| | | | |
|---|---|---|---|
| 1,390,949 | 9/1921 | Yassenoff | 74/567 |
| 1,477,640 | 12/1923 | Fisher | 164/112 X |
| 1,708,164 | 4/1929 | Widell | 74/567 |
| 2,025,336 | 12/1935 | Brearley | 164/369 X |
| 2,639,952 | 5/1953 | Whitely | 164/98 X |
| 3,206,811 | 9/1965 | Bellsnyder, Jr. | 164/367 |

FOREIGN PATENTS OR APPLICATIONS 817,382    5/1937    France..................74/567

*Primary Examiner*—R. Spencer Annear
*Attorney*—Waters, Roditi, Schwartz & Nissen

[57]           ABSTRACT

A method of casting a cam shaft with an axial oil passage comprising inserting a core rod into a steel pipe in closely fitted relation, coating the solid core on its outer periphery with a releasing agent of low thermal conductivity, placing the core and pipe assembly in a mould with the solid core aligned with the axis of a cam shaft to be formed, and pouring molten metal around the core assembly in the mould. Thereafter, upon completion of the casting, the solid core is withdrawn from the pipe to thereby form the aligned oil passage, within the cam shaft.

4 Claims, 2 Drawing Figures

METHOD OF CASTING COMPOSITE CAM SHAFTS

This application is a division of our earlier application Ser. No. 797,128 filed Mar. 29, 1968, and now abandoned.

The invention relates to a method of casting a cam shaft which has axial oil passage at its center.

Usually a cam shaft is formed with a number of cam surfaces along its length and lubrication of such cam surfaces has been effected by external application of lubricating oil as by rocker arms. It is obviously desirable to provide self-lubrication for these surfaces, but the known cam shafts do not have a satisfactory central oil passage for this purpose, because of difficulties in machining and achieving alignment and precision of such axial bore. Thus if the bore is to be machined by drilling operation, slight deviation of the bore from axial alignment results in an eccentric center of gravity which, upon rotation of the cam shaft, causes vibration of the latter, thereby giving rise to faulty functioning and restricting the maximum permissible speed of rotation. In the most undesirable case, the cam shaft may be broken by an undue concentration of stresses. For this reason, it has only been possible heretofore to provide an axial bore in a cam shaft of reduced length that is comparable with a crank shaft. Although it may be considered to provide an axial bore in the cam shaft by using a core when the shaft is cast, this is only theoretical and could not provide a satisfactory cam shaft having the required rigidity and straightness particularly when it is of great length and/or small diameter.

Therefore, it is an object of the invention to provide a novel method of casting an elongated cam shaft in which there is formed an axial oil passage at its center.

When a steel pipe is used as a core to be placed in a mold and molten metal of about 1300° C. is poured around the steel pipe, the inner periphery of the core will be raised in temperature up to 800° to 1000° C., while its outer periphery will be subject to as high a temperature as 1200° C. Such high temperatures substantially decrease the mechanical strength of the core, which may be caused to be bent by thermal stress. In addition, by virtue of the differential specific gravities between the molten metal and the cavity within the core, buoyancy is produced to lift the core, or hydraulic pressure is exerted by flowing molten metal, both of these acting to displace the core into misalignment and to bend or otherwise distort the core by unbalanced forces along its length. The bending tendency of the core may be avoided by using a thick core pipe, but because of an increased heat capacity, the temperature of the molten metal is lowered so that it becomes insufficient to have the core pipe bonded together with the body of the cam shaft. Moreover, the body may be chilled with the consequence that extreme difficulty is experienced in drilling transverse bores from the cam surfaces to the core pipe.

According to the invention, there is provided a method for casting a cam shaft having an aligned axial oil passage, comprising the steps of preparing a core assembly which comprises a steel core pipe and a solid core closely fitted in the steel pipe, said solid core being coated on its outer periphery with a releasing agent of low thermal conductivity, placing the core assembly in a mold with the solid core being aligned with the axis of a cam shaft to be formed, pouring molten metal around the core assembly in the mold, and thereafter, upon completion of the casting, withdrawing said solid core from the core assembly to thereby form the aligned oil passage within said steel pipe.

Figure 2:
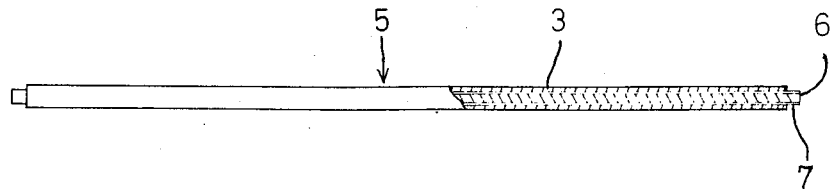

Further details of the invention will become apparent from the following description with reference to the drawing, wherein;

FIG. 1 is an elevation view, partly in longitudinal section, of a cam shaft produced by method of the invention, and FIG. 2 is an elevation view, partly in longitudinal section, of a core assembly including a solid core used in carrying out the method of the invention.

Referring to FIG. 1, a body of cam shaft 1 is shown to be formed on its outer periphery and along its length with a number of cams, as indicated at 2, of various sizes and configurations. A steel pipe 3 runs axially inside the body 1 and is made integral therewith. Transverse bores, only one of which is indicated at 4, are drilled through the body 1 and the steel pipe 3 to communicate with the central oil passage defined by the inner space of the steel pipe. Such oil passage is connected in use with a supply of pressurized lubricating oil for forced lubrication of the cam surfaces 2.

FIG. 2 shows a core assembly 5 which is used in accordance with the invention to produce the cam shaft 1 shown in FIG. 1. The assembly comprises the steel pipe 3 and a solid core 6 closely fitted in the pipe. Before the solid core 6 is placed in the pipe, a thin coating of releasing agent 7 of low thermal conductivity and capable of withstanding the casting temperature is applied all over the surface of the core 6 to entirely cover it. The solid core 6 provides a sufficient mechanical strength to the core assembly to resist any bending force applied thereto by flowing molten metal or by thermal stress. To this end, the core 6 is made of a material of high strength and a heat resisting steel rod may be used. In order to carry out the invention successfully, it is essential that the coating of releasing agent 7 provides a good thermal insulation between the steel pipe 3 and the solid core 6 while permitting close engagement therebetween. Without such insulation by releasing agent 7, the metal contact between the parts 3 and 6 will be a good heat conductor to carry away substantial heat from the molten metal, and in view of the large heat capacity of the solid core 6, the temperature of the molten metal will be substantially reduced with a corresponding loss in the mechanical strength of the cam shaft obtained. In addition, the body 1 may become cooled so that the subsequent drilling of oil bores or transverse bores 4 will involve difficulty. Still further, reduced temperature of the molten metal adversely influences the flow of the molten metal in the mold so that the resulting casting may not be precisely to size as defined by the mold. Specifically, the cam surface may become rounded in an undesirable manner or the thickness of the body 1 will not be uniform along the length of cam shaft, thereby resulting in are unsatisfactory casting. The coating of releasing agent 7 must not be scraped off the solid core 6 as it enters the steel pipe 3, but should be collapsed or burnt upon casting to facilitate removal or withdrawal of the solid core 6 from the steel pipe 3. Suitable material for such releasing agent includes resin sand or shell mold, silica sand, dry oil sand, graphite powder and various plastics. When resin sand is uniformly distributed over a heated solid core 6 while rotating, it naturally melts onto the core to form a thin coating thereon.

Thus the invention relates to a long cam shaft having a straight, aligned oil passage in a simple manner and of substantial mechanical strength. The thickness of the core pipe may be reduced to improve its bonding quality with the body of the cam shaft. The core pipe 3 may be provided on its exterior with a plating of low-melting material of high thermal conductivity, such as copper, nickel, tin and soft alloys thereof, which plating serves to improve the bonding between the body 1 and the core pipe 3.

An example of the invention will be described below, but it should be understood that the invention is not to be limited to such example but is defined in the appended claims:

EXAMPLE

A cam shaft which is generally similar to that shown in FIG. 1 and having a shaft length of 488 mm, stem diameter of 26.8 mm and journal diameter of 48.6 mm has been prepared. The minimum cam diameter on the cam shaft was 33.4 mm. A polished mild steel (carbon steel) pipe having a length of 518 mm, outer diameter of 12 mm and inner diameter of 10 mm was used as the core pipe. The polished steel pipe facilitated the formation of an uninterrupted uniform plating of copper thereon. A carbon steel rod having a length of 528 mm and diameter of 8 mm was used as a solid core. The steel rod was heated to a temperature between 250° C. and 300° C., inserted into the core pipe, and while being held in alignment, resin sand having a particle size of 150 to 200 mesh was blown into the annular space between the rod and the core pipe. Alternatively, such coating of releasing agent may be formed by embedding a heated core rod into a mass of resin sand for a controlled time period and inserting the coated rod into the pipe before the surface of the coating sets completely. The coating thickness of the releasing agent required depends upon its thermal insulating power, but usually should not be less than 0.5 mm from the consideration of maintaining good thermal insulation. The core assembly thus formed was placed in a shell mold, which may be replaced by a sand-mold. The molten metal used had the following composition:

| | |
|---|---|
| C | 3.35% |
| Si | 2.00% |
| Mn | 0.80% |
| Cr | 0.90% |
| Mo | 0.20% |
| Ni | 0.20% |
| inoculant, Cu-Si | 0.20% |
| Fe | the rest. |

The metal was melted at a temperature between 1480° C. and was poured into the mold at a temperature between 1310° C. and 1350° C.

Non-destructive testing by X-ray examination of the cam shaft obtained showed an excellent straightness of the oil passage defined by the steel pipe 3.

Hardness testing was conducted by measurement of Rockwell C scale hardness. In the stem portion of the cam shaft, the hardness measured at five points equiangularly spaced on a circle in a transverse section ranged from 19.3 to 21.0 with an average of 20.4. In a journal portion, the hardness at five similar points ranged from 18.5 to 19.4 with an average of 19.0. In a cam portion of oval-shaped section, ten points were selected for measurement along the semi-major axis in which the cam extends, these points being located at an interval of 1 mm from the top of the cam surface. The hardness gradually decreased from 52.3 at the outermost point to 43.1 at the innermost point, averaging 48.8. The hardness at a point on the other semi-major axis was 22.0, and on each semi-minor axis, the hardness measured 31.8 and 27.2, respectively. These measurements clearly show that transverse bores 4 can be easily drilled.

The cam shaft thus produced had a transverse breaking strength of about 40 kg/mm$^2$, as compared to about 30 kg/mm$^2$ obtained with the prior art cam shaft of relatively short length in which an oil passage is drilled.

What is claimed is:

1. A method of casting a cam shaft with an axial steel pipe embedded therein to provide an axial oil passage in the cam shaft, said method comprising the steps of forming an assembly of a steel pipe with a solid core rod inserted therein, providing a coating of a releasing agent of low thermal conductivity between the core rod and pipe, placing said assembly in a mold with the solid core rod aligned with the axis of a cam shaft to be formed, pouring molten metal into the mold around the core assembly, allowing the molten metal to solidify on the steel pipe to become united therewith, and thereafter withdrawing said solid core from said assembly thereby to form the aligned oil passage within said steel pipe.

2. A method as claimed in claim 1, further including the step of plating the outer cylindrical surface of the steel pipe with a low melting metal before said molten metal is poured around the core assembly, thereby causing the low melting metal to melt, upon said pouring, to bond the steel pipe with the body of the cam shaft.

3. A method as claimed in claim 1 comprising drilling radial passages in said cam shaft through the cast metal and steel pipe to provide communication between the axial passage and the outer periphery of the cam shaft.

4. A method as claimed in claim 1 wherein said core rod is made of a heat resisting steel to provide mechanical strength to said assembly to resist bending forces applied thereto.

* * * * *